Jan. 21, 1947.        W. W. GARY        2,414,642
PORTABLE FOOD DEHYDRATOR EMPLOYING HOT AIR AND A DESICCANT
Filed Sept. 14, 1943

WRIGHT W. GARY,
INVENTOR.

BY Philip Subkow
ATTORNEY.

Patented Jan. 21, 1947

2,414,642

UNITED STATES PATENT OFFICE 2,414,642

PORTABLE FOOD DEHYDRATOR EMPLOYING HOT AIR AND A DESICCANT

Wright W. Gary, Los Angeles, Calif., assignor to Filtrol Corporation, Los Angeles, Calif., a corporation of Delaware Application September 14, 1943, Serial No. 502,367

2 Claims. (Cl. 34—92)

This invention relates to an apparatus for the desiccation of drying of materials, such as the dehydration of vegetables, meats, and other food products.

It is an object of this invention to devise a cheap, portable apparatus suitable for home use for dehydration of vegetables, fruits, meats, and other food products.

It is another object of this invention to employ a current of dry air as the dehydration medium and to employ a dehydration agent to dehydrate the air for such use.

It is a further object of this invention to employ a granular regeneratable desiccant for the said dehydration of air.

Further objects of the invention will appear from the following specification taken together with the drawing, in which.

Figure 1:
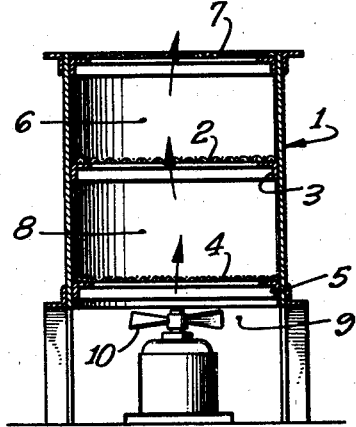
Fig. 1 is a vertical section of one form of the dehydrator of my invention.

In Fig. 1, container 1 carries a removable perforated shelf 2 supported on a ring 3 attached to the container 1. Beneath the shelf 2 is a second removable shelf 4 carried on ring 5 attached to the container 1. The container 1 extends below the shelf 4 and its top is covered by a perforated cover 7. The space 6 provides a chamber for the vegetable or other food product to be dehydrated. The chamber 8 provides a space for the desiccant to be employed in this apparatus. The space 9 below the chamber 8 is provided for a fan or other draft generation medium.

The apparatus is charged by removing the shelf 2 and introducing the desiccant material into the chamber 6. Such material may be silica gel, adsorbent charcoal, Activated Alumina, bauxite, anhydrous calcium sulfate, diatomaceous earth, carbon black impregnated with calcium chloride, or other water adsorbing medium. It is preferably a suitably dried, natural sub-bentonite of the montmorillonite family or an acid-treated sub-bentonite clay. Such clays are well known as those which on acid treatment develop oil-decolorizing and catalytic properties.

I prefer to use such clays which have been carefully dried to about 5 to 8% moisture. Such clays have a high water-adsorptive efficiency. I may use such clays in various mesh sizes, for instance, such as will be retained on a number 8 or even on a number 12 mesh screen. I may use pelleted clay formed into pellets of $\tfrac{1}{16}''$ or $\tfrac{1}{8}''$ diameter and from $\tfrac{1}{16}''$ to $\tfrac{1}{2}''$ length. A typical clay such as described above will show the following adsorptive characteristics when dried to 6% moisture (V. M., that is, the volatile matter determined as loss on heating at 1700° F. to constant weight expressed as percentage of the unheated material) when tested by the method described in the bulletin entitled "Bureau of Ships ad Interim Specification," issued November 1, 1940, No. 51S32 (INT), and in the "Army-Navy Aeronautical Specification," AN–D–6, issued November 20, 1942:

| Air relative humidity | Per cent water vapor adsorption |
|---|---|
| 10% | 9.3 |
| 20% | 14.3 |
| 40% | 19.8 |
| 60% | 23.7 |
| 80% | 28.4 |
| 100% | 38.7 |

I may employ such clays which have been acid treated and dried to about 5 to 6% moisture (V. M.). Such clays may, for example, exhibit the following adsorptive efficiencies:

| Air relative humidity | Per cent water adsorption |
|---|---|
| 20% | 7.5 |
| 40% | 15.0 |
| 60% | 20 |
| 80% | 30 |

I may employ as my desiccant one which will show the following per cent water adsorption at the following relative humidities:

| Relative humidity | Per cent water vapor adsoprtion |
|---|---|
| 10% | About 5 to about 15%. |
| 20% | About 10 to about 17%. |
| 40% | About 15 to about 30%. |
| 60% | About 18 to about 45%. |
| 80% | About 25 to about 70%. |

It is desirable to use an adsorbent such that the vapor tension of water from the adsorbent is less during dehydration than the vapor tension of the water in the food to be dehydrated. It is preferred to employ a desiccant in such amount and of such efficiency that the vapor tension of the water over the vegetables when dried to about 2 to 10% moisture will be equal to or greater than the vapor tension of the water over the desiccant employed in that stage of the dehydration. In this manner the foods undergoing dehydration lose the water to the desiccant. In order to employ the circulating air as an effective carrier medium, the air circulated over the food should have moisture in an amount such that the partial pressure of the moisture is always less than the vapor pressure of the moisture in the food being dehydrated. If, then, the desiccant being employed has a water retention so that the vapor pressure of the water in the adsorbent is less than the partial pressure of the moisture in the air passing to the adsorbent, the adsorbent will receive moisture from the air and dry the air. With these principles in mind, the proper choice of adsorbent and operating conditions may be fixed for the best performance of my process.

The whole apparatus may be placed in the oven of an ordinary cook stove and the usual thermostat set for about 100° F. to 120° F. For some vegetables the temperature may be gradually raised from ordinary room temperature to a finishing temperature of about 140° or 150° F. to 180° F. The natural draft will cause the air to travel upward through the desiccant compartment 7 and thence through the vegetable compartment. In passing through the desiccant compartment the air is dried to a very low humidity and in passing through the vegetables will pick up the moisture more readily. Because of this more efficient dehydration with dry or partially dehumidified air, the vegetables may be dried at a lower finishing temperature, thus further preserving the food and vitamin characteristics of the food.

Figure 2:
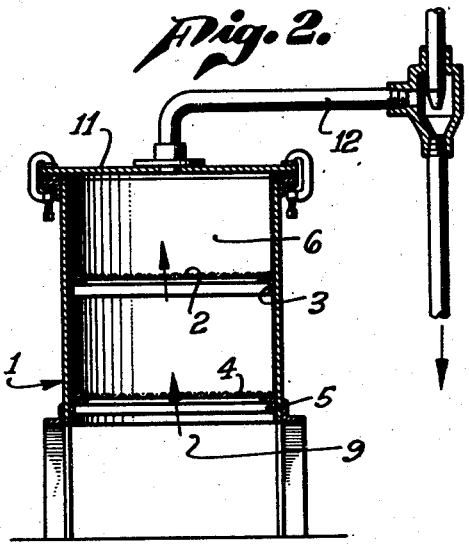
Fig. 2 is a modification of the apparatus shown in Fig. 1.

If it is desired to enhance the draft through the dehydrator system, a fan 10 may be placed in the compartment 9. Instead of using a fan an ejector may be used as illustrated in Fig. 2. The dehydrator 1, such as described in connection with Fig. 1, is covered by a tight lid 11 carrying an outlet 12 which may be connected to a vacuum pump or aspirator such as a water jet air pump which may be connected to the faucet. Depending on the source of vacuum, absolute pressures of from 10 to 100 mm. of mercury may be maintained in the dehydrator. In such cases dehydration may be carried on at relatively low temperatures, as low as room temperature or, if desired, temperatures of up to about 100 to 125° F. may be maintained.

Figure 3:
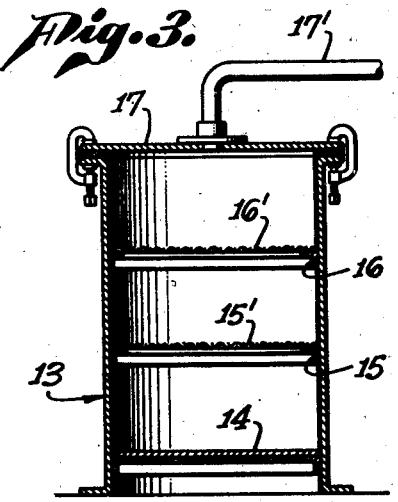
Fig. 3 is a vertical section of another form of the apparatus.

In the modification shown in Fig. 3, the dehydrator 13 is sealed by a bottom closure 14 and is provided with a ring 15 on which rests a perforated diaphragm 15' and a ring 16 carrying a perforated diaphragm 16'. The dehydrator 13 carries a tightly fitting closure 17 carrying an outlet 17' which is connected to a vacuum pump or water jet or ejector. The desiccant material is placed on the diaphragm 15' and the food to be dehydrated is placed on the bottom compartment above bottom 14. The ejector creates a vacuum and the evaporated water vapor is adsorbed on the desiccant material and in this manner low vacuum may be maintained. A vacuum as low as the vapor pressure of water at the temperature of the water ejector, if such is employed, may be attained, and, of course, lower vacuum by means of a vacuum pump or steam ejector may be attained; for instance, absolute pressures of from 10 to 100 mm. may be maintained. This will permit drying at relatively low temperatures of about 100° F. and one may also, by prolonging the time, dehydrate the vegetables at even lower temperatures.

Figure 4:
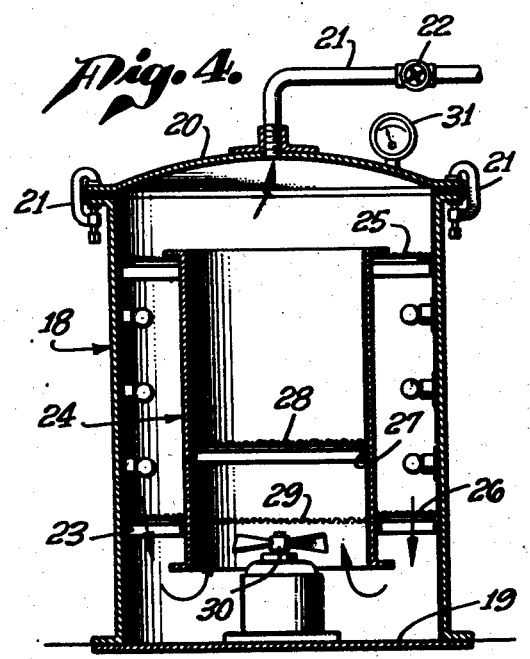
Fig. 4 is a vertical section of another form of apparatus.

Fig. 4 shows a modification of my dehydrator embodying recirculation vacuum dehydration. This dehydrator consists of a chamber 18 having a bottom 19 closed by a lid 20 and held tight by C clamps 21. Suitable gaskets are provided to make a vacuum-tight seal between the lid and container. Lid 20 has an outlet 21 carrying a valve 22. The container carries a ring 23 on which is set the concentric container 24 carrying perforated annuli 25 and 26. The container 24 which is open at the top and bottom has a retaining ring 27 carrying the perforated diaphragm 28. The container 24 also has a lower perforated diaphragm 29. The fan 30 is carried by the bottom 29 and has suitable electrical connections to the exterior.

The apparatus is charged by removing the diaphragm 28 and introducing desiccant material such as previously described onto the diaphragm 29. The perforated diaphragm 28 is then placed on the ring 27 and vegetables, fruits, or meat, or other material to be dehydrated are placed on the diaphragm 28. The lid 20 is placed on the container and C clamps 21 are secured. The pipe 21 is connected to a source of vacuum such as a water operated air ejector. When suitable vacuum, as shown by vacuum gauge 31, has been established in the container, the valve 22 is closed. Air by means of fan 30 is circulated upward through the desiccant as shown in Fig. 4 and is dehydrated and then passed upward through the material being dehydrated. On recirculation the air again passes through the desiccant and the air is removed. In this way vacuum is maintained in the dehydrator and low temperature dehydration of the vegetables can be attained. The water removed from the dehydrated material is adsorbed on the adsorbent or desiccant. If desired the dehydration may be carried on above room temperature.

In order to obtain the desired elevated temperature heating elements are optionally provided. Thus, for example, incandescent lamps may be mounted in the annular space, as illustrated in Fig. 4. Suitable electrical connections, not shown, may be provided. These lamps may be mounted at spaced intervals around the interior of the wall of container and be thermostatically controlled to maintain the desired temperature.

This apparatus may, of course, also be operated at ordinary pressure without vacuum, in which case it is merely necessary to charge the apparatus as described without evacuating the chamber. In this case the desiccant acts to remove the water from the circulating air and to evaporate the moisture from the vegetables or other foods by passing a current of dry air over the vegetables or other food.

When the desiccant has been sufficiently spent as a result of the adsorption of an amount of water sufficient to reduce its water-adsorption capacity below the economic level, the desciccant may be revivified. This may conveniently be done with the desiccant in place in the dehydrator by heating the desiccant to about 300–600° F. and by passing a current of air over the desiccant if desired. In employing the sub-bentonite desiccant previously described, I prefer to carry out the regeneration at a temperature of about 300–400° F.

A convenient way to carry out this regeneration is to provide a container for the desiccant, such as a cardboard container which will fit into the desiccant space of the dehydrator described above. The bottom and top of the container are perforated. The container with the active desiccant is introduced into the dehydrator. When the desiccant is spent, the container may be removed and heated in an oven or even in a cook stove to the above temperatures.

While I have described a particular embodiment of my invention for the purpose of illustration, it should be understood that my invention includes various modifications and adaptations thereof as come within the scope of the appended claims.

I claim:

1. A portable dehydrator comprising: an outer chamber; a removable closure for said outer chamber; a valved outlet on said closure; an inner chamber located within and spaced from said outer chamber and forming an annular passageway; a food compartment in said inner chamber; a desiccant compartment in said inner chamber; means for circulating air through the desiccant and the food compartment and through said annular passageway; and means for withdrawing air from said outer chamber to establish a vacuum in said outer chamber.

2. A portable dehydrator comprising: an outer chamber; a removable closure for said outer chamber; an inner chamber located within and spaced from said outer chamber and forming an annular passageway; a food compartment in said inner chamber; a desiccant compartment in said inner chamber; means for circulating air through the desiccant and the food compartment and through said annular passageway; and means for withdrawing air from said outer chamber to establish a vacuum in said outer chamber.

WRIGHT W. GARY.